(12) United States Patent
Grech et al.

(10) Patent No.: US 12,474,054 B2
(45) Date of Patent: Nov. 18, 2025

(54) GAS TURBINE ENGINE

(71) Applicant: ROLLS-ROYCE plc, London (GB)

(72) Inventors: Nicholas Grech, Derby (GB); Jacopo Tacconi, Derby (GB)

(73) Assignee: Rolls-Royce plc

(*) Notice: Subject to any disclaimer, the term of this patent is extended or adjusted under 35 U.S.C. 154(b) by 0 days.

(21) Appl. No.: 18/776,426

(22) Filed: Jul. 18, 2024

(65) Prior Publication Data

US 2025/0224113 A1 Jul. 10, 2025

(30) Foreign Application Priority Data

Aug. 1, 2023 (GB) .................................... 2311808

(51) Int. Cl.
*F23R 3/28* (2006.01)
*F02C 7/224* (2006.01)
*F02C 9/18* (2006.01)

(52) U.S. Cl.
CPC ................ *F23R 3/28* (2013.01); *F02C 7/224* (2013.01); *F02C 9/18* (2013.01); *F05D 2220/323* (2013.01); *F05D 2260/20* (2013.01)

(58) Field of Classification Search
CPC ............... F02C 3/22; F02C 7/224; F23R 3/28
See application file for complete search history.

(56) References Cited

U.S. PATENT DOCUMENTS

2022/0099020 A1* 3/2022 Palmer ...................... F02C 9/26
2023/0278714 A1* 9/2023 Wang ......................... F02C 9/32
60/39.465

FOREIGN PATENT DOCUMENTS

| EP | 3978738 A1 | 4/2022 |
| EP | 4163481 A1 | 4/2023 |
| EP | 4239170 A1 | 9/2023 |

OTHER PUBLICATIONS

Great Britain search report dated Dec. 12, 2023, issued in GB Patent Application No. 2311808.6.

* cited by examiner

*Primary Examiner* — Scott J Walthour
(74) *Attorney, Agent, or Firm* — Barnes & Thornburg

(57) ABSTRACT

An aircraft propulsion system includes a gas turbine engine configured to burn hydrogen fuel supplied from a cooled hydrogen supply via a fuel conduit. A fuel offtake is configured and arranged to divert a portion of hydrogen fuel from the fuel conduit. A burner is configured to burn the portion of hydrogen fuel diverted from the main fuel conduit with air bled from the core compressor via an offtake to produce exhaust gases. A heat exchanger is configured to transfer heat from the exhaust gasses produced by the burner to hydrogen fuel in the main fuel conduit.

17 Claims, 7 Drawing Sheets

GAS TURBINE ENGINE

CROSS-REFERENCE TO RELATED APPLICATIONS

This specification is based upon and claims the benefit of priority from United Kingdom patent application number GB 2311808.6 filed on Aug. 1, 2024, the entire contents of which is incorporated herein by reference.

BACKGROUND

Technical Field

This disclosure relates to fuel systems for hydrogen-fuelled aero gas turbine engines.

Description of the Related Art

In order to limit emissions of carbon dioxide, use of hydrogen as an alternative to hydrocarbon fuel in gas turbine engines has historically only been practical in land-based installations. However, more recently there has been interest in aircraft powered by hydrogen stored at cryogenic temperatures, as either a compressed gas, a supercritical fluid, or a liquid. Such fuel requires heating prior to delivery to the gas turbine, both to permit combustion, and to prevent icing. As such, the applicant has filed patent application EP 3978738 directed to a pre-heater for heating hydrogen gas using an auxiliary combustor utilising a portion of the hydrogen fuel, and air bled from the gas turbine engine.

However, operation of the pre-heater significantly reduces efficiency of the gas turbine engine, resulting in an increase in specific fuel consumption of several percent. The present disclosure seeks to provide an improved system, having greater efficiency.

SUMMARY

The invention is directed towards a gas turbine engine comprising a fuel system having a hydrogen fuel heater for heating cryogenically-stored hydrogen fuel prior to injection into gas turbine engines, and methods of operating such gas turbines.

In a first aspect there is provided an aircraft propulsion system comprising a gas turbine engine configured to burn hydrogen fuel supplied from a hydrogen supply via a fuel conduit, the gas turbine engine comprising:
  a core engine comprising a compressor, a combustor and a turbine in sequential air flow series;
  a fuel offtake configured and arranged to divert a portion of hydrogen fuel from the fuel conduit;
  a burner configured to burn the portion of hydrogen fuel diverted from the main fuel conduit with air bled from the core compressor via an offtake to produce exhaust gases;
  a heat exchanger configured to transfer heat from the exhaust gasses produced by the burner to hydrogen fuel in the main fuel conduit, to provide heated hydrogen fuel at a temperature T; wherein
  the burner is configured to extract a percentage core air mass flow W %, and a ratio $R_1$ of core air mass flow W % to heated fuel temperature T in Kelvin (K) is between 0.008 and 0.015 $K^{-1}$ at maximum take-off conditions.

Advantageously, the gas turbine engine comprises a fuel system which provides sufficient heating of hydrogen fuel, while minimising core gas turbine engine performance penalties.

The ratio $R_1$ of core air mass flow W % to heated fuel temperature T may be between 0.01 and 0.013 and may be between 0.011 and 0.012 and may be approximately 0.01 $K^{-1}$ at maximum take-off conditions.

The burner may be configured to provide an exhaust gas outlet temperature of between 900K and 1200K, and may be configured to provide an exhaust gas outlet temperature of approximately 1000K.

The burner may be configured to extract a percentage core air mass flow W % between 3% and 6%, and may be between 3.2% and 5.8%, and may be between 3.2 and 3.6% at maximum take-off conditions.

The burner and heat exchanger may be configured to provide a heated hydrogen fuel temperature T of between 150 and 450K, and may be configured to provide a hydrogen fuel temperature T of between 273 and 450K.

The gas turbine engine may comprise a low-pressure compressor and a high-pressure compressor coupled to a low-pressure turbine and a high-pressure turbine respectively by respective independently rotatable shafts. The compressor bleed offtake may be associated with the high-pressure compressor.

The hydrogen supply tank may be configured to store liquid hydrogen. The hydrogen supply tank may be configured to store liquid hydrogen at a temperature between 15 and 30K, and may be configured to store liquid hydrogen at a temperature of approximately 22K.

The cooled hydrogen supply tank may be configured to store liquid hydrogen at a pressure of between 1 and 4 Bar, and may be configured to store liquid hydrogen at approximately 2 Bar.

The aircraft propulsion system may comprise a hydrogen pumping system configured to provide pressurised hydrogen to the burner and to the gas turbine engine core combustor.

The hydrogen pumping system may be configured to provide hydrogen having a pressure of between 10 and 100 Bar, and may be configured to provide hydrogen having a pressure of approximately 50 Bar.

The gas turbine engine may comprise at least first and second compressor bleed offtakes provided at different stages of the core compressor. Optionally, the gas turbine engine additionally comprise third, and, optionally, fourth compressor bleed offtakes, the third, and, optionally, fourth compressor bleed offtakes being provided at different pressure stages of the compressor. The gas turbine engine may comprise bleed offtake valves configured to control flow through respective compressor bleed offtakes.

At least the first and second compressor bleed offtakes may be configured to bleed a portion of air from the high-pressure compressor.

The gas turbine engine comprises a controller may be configured to control each of the compressor bleed offtake valves in accordance with a schedule.

The controller may be configured to select a bleed offtake valve at the lowest compressor stage which meets at least one of a pre-heater minimum combustion pressure and a pre-heater minimum combustion temperature for provision of compressed air to the burner.

The controller may be configured to select a bleed offtake valve for provision of compressed air to the burner, which meets a pre-heater minimum combustion pressure and a required fuel delivery minimum temperature while resulting in the lowest overall system fuel flow.

The burner may comprises the heat exchanger. In another embodiment, the burner and the heat exchanger are separate units.

In a second aspect, there is provided a method of delivering hydrogen fuel to a gas turbine engine, comprising:
- pumping hydrogen fuel from a storage tank through a fuel conduit;
- diverting a portion of the hydrogen fuel from the main fuel conduit;
- extracting a percentage of core mass air flow W % from a compressor of the gas turbine engine;
- burning the portion of hydrogen fuel diverted from the main fuel conduit in a burner with the compressed air extracted from the gas turbine engine compressor to produce exhaust gases, and exchanging heat between the exhaust gases and the hydrogen fuel in a heat exchanger to produce heated hydrogen fuel at a temperature T; wherein
- a ratio $R_1$ of core air mass flow W % to heated fuel temperature T is between 0.008 and 0.015 $K^{-1}$.

The method may comprise operating the burner to provide an exhaust gas outlet temperature of between 900K and 1200K, and may comprise operating the burner to provide an exhaust gas outlet temperature of approximately 1000K.

The method may comprise operating the gas turbine engine and pre-heater to extract a percentage core air mass flow W % between 3 and 6 at maximum take-off conditions.

The method may comprise operating the burner to heat hydrogen fuel to a temperature T of between 273 and 450K.

The method may comprise storing hydrogen in the tank as a liquid. The method may comprise storing liquid hydrogen at a temperature between 15 and 30K, and comprise storing liquid hydrogen at a temperature of approximately 22K.

The method may comprise storing hydrogen in the hydrogen tank at a pressure of between 1 and 4 Bar of pressure, and comprise storing liquid hydrogen in the tank at approximately 2 Bar.

The method may comprise pumping the hydrogen to provide a pump outlet pressure of between 10 and 100 Bar, and comprise pumping the hydrogen to provide a pump outlet pressure of approximately 50 Bar.

DESCRIPTION OF THE DRAWINGS

An embodiment will now be described by way of example only with reference to the accompanying drawings, which are purely schematic and not to scale, and in which.

DETAILED DESCRIPTION

Figure 1:
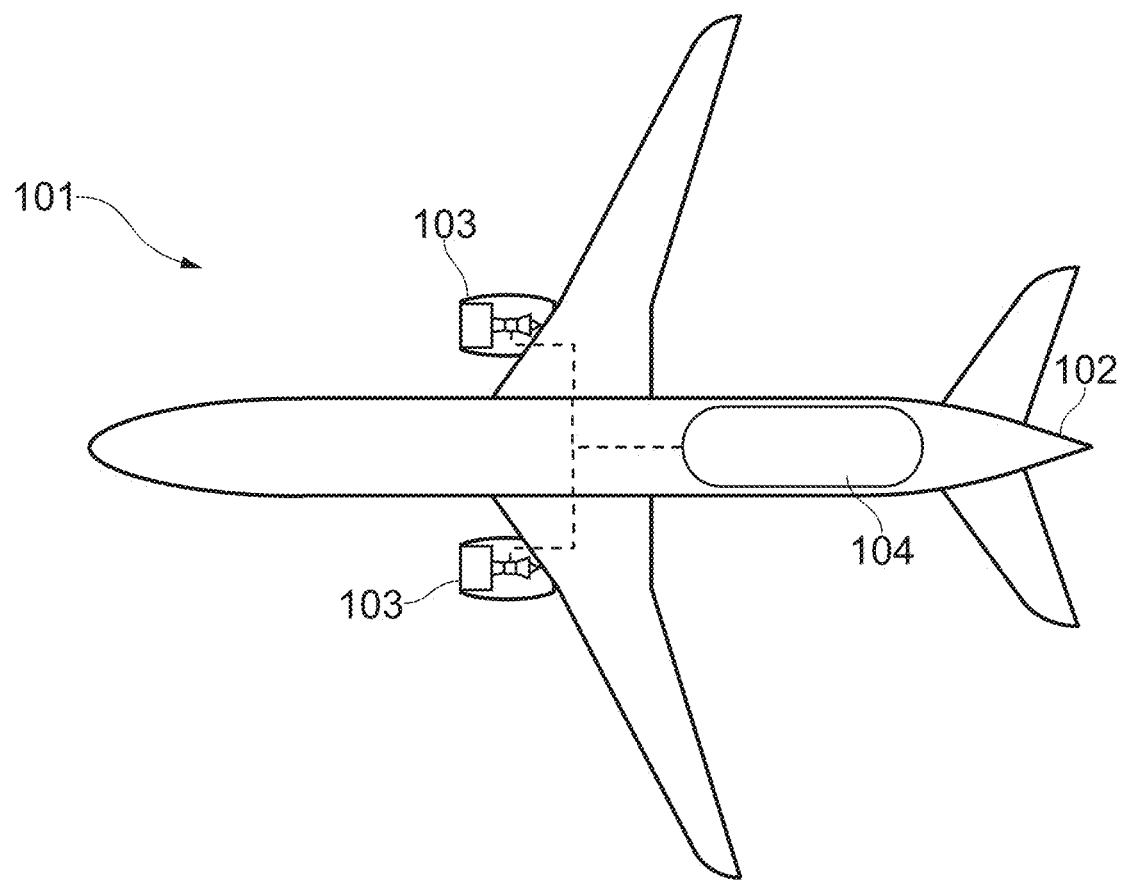
FIG. 1 shows a hydrogen-fuelled airliner comprising hydrogen-fuelled turbofan engines.

A hydrogen-fuelled airliner is illustrated in FIG. 1. In this example, the airliner 101 is of substantially conventional tube-and-wing twinjet configuration with a central fuselage 102 and substantially identical underwing-mounted turbofan engines 103.

A hydrogen storage tank 104 located in the fuselage 102. In the present embodiment, the hydrogen storage tank 104 is a cryogenic hydrogen storage tank and thus stores the hydrogen fuel in a liquid state, in a specific example at 22 Kelvin. In this example, the hydrogen fuel is pressurised to a pressure from around 1 bar to around 3 bar, in a specific example 2 bar.

Figure 2:
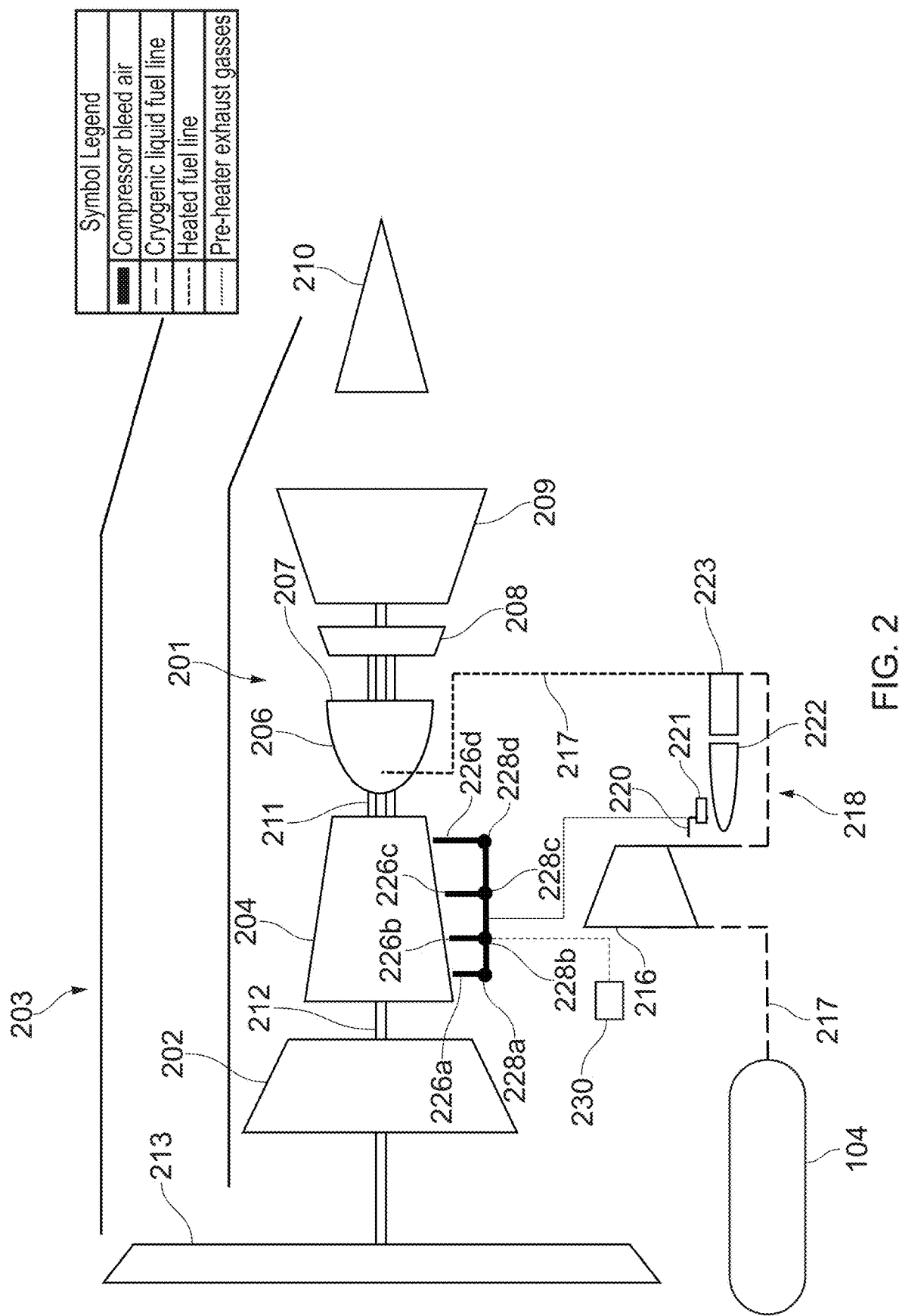
FIG. 2 is a block diagram of one of the engines of FIG. 1.

A block diagram of one of the turbofan engines 103 is shown in FIG. 2.

The turbofan engine 103 comprises a core gas turbine 201.

The core gas turbine 201 comprises, in fluid flow series, a low-pressure compressor 202, a high-pressure compressor 204, a fuel injection system 206, a combustor 207, a high-pressure turbine 208, a low-pressure turbine 209, and a core nozzle 210. The high-pressure compressor 204 is driven by the high-pressure turbine 208 via a first shaft 211, and the low-pressure compressor 203 is driven by the low-pressure turbine 209 via a second shaft 212. It will be appreciated that in alternative embodiments, the core gas turbine could be of three-shaft configuration.

In operation, the low-pressure turbine 209 drives a fan 213 via shaft 212.

In operation, hydrogen fuel is pumped from the hydrogen storage tank 104 by a pump 216 and into a main fuel conduit 217 which ultimately delivers fuel to the fuel injection system 206. The pump may be driven by an electric machine or via one or more of the gas turbine engine core shafts 211, 212 via an auxiliary gearbox.

Hydrogen within the storage tank 104 is generally stored as a liquid at between 15 and 30 Kelvin (K), at a pressure of between 1 and 4 Bar (i.e. between $1 \times 10^5$ Pascals and $4 \times 10^5$ Pascals). Higher temperatures will result in higher pressures required for storage of the hydrogen as a liquid. Higher pressures will generally necessitate heavier tanks. In one system modelled by the inventors, the hydrogen was stored as 22K, at a pressure of 2 Bar.

As will be appreciated, it is desirable to increase the temperature of the fuel from the 22 Kelvin cryogenic storage condition to a temperature much closer to the firing temperature of the core gas turbine 201; of course this is subject to the constraint of not exceeding the autoignition temperature of the hydrogen fuel prior to admission into the combustor 207. In an example, the injection temperature is from 273 (the melting point of water) to 450 kelvin. In some cases, it may be desirable to increase the fuel temperature to above an icing temperature, such as 273 Kelvin.

In the present embodiment, a heater 218 is therefore provided for heating of the hydrogen fuel, and possibly to implement a phase change where the hydrogen is stored as a liquid. In the present embodiment, this takes place between the pump 216 and the fuel injection system 206. In an embodiment, the heater 218 is configured to raise the temperature of the hydrogen fuel to the required injection temperature.

The heater 218 comprises an offtake 220 to divert a portion of the hydrogen fuel from the main fuel conduit 217. The amount of hydrogen bled from the main fuel conduit 217 is controlled by a valve (not shown). In an embodiment, the valve is controlled actively, for example in response to the temperature of the fuel at the fuel injection system 206. Alternatively, the valve may be passively controlled. In operation, of the order of around 1 percent of the hydrogen fuel flow through the main fuel conduit 217 is bled for use in the heater 218.

As described previously, hydrogen has very high specific and latent heat capacities; however as a gas it has a very low molecular weight and density, and thus it can be challenging to exchange heat in a compact way. However, these properties may also be beneficial, as described later herein. Thus, the heater 218 heats the hydrogen fuel in the main fuel conduit 217 by combustion of the bled fuel in a burner 222 located in heat exchange relationship with the main fuel conduit 217 via a heat exchanger 223. As will be understood, fuel for the burner 222 must also be provided at an acceptable temperature, and a smaller auxiliary fuel heater 221 may be provided for this.

It should be understood that, in the present example, the products of combustion from the burner 222 are not mixed with the fuel in the main fuel conduit 217. In this respect, the pre-heater 218 therefore differs from a pre-burner system as used in staged combustion cycle rocket engines.

In order to reduce the volume of the burner 218, it is desirable to use a high-pressure source of air, which provides sufficient mass-flow in a small volume to combust the hydrogen fuel. As such, air for combustion with the bled hydrogen fuel is bled from a compressor of the gas turbine engine core, and in this embodiment, from the high-pressure compressor 204. Air is bled from the high-pressure compressor 204 from a plurality of compressor bleeds 226a-d via respective bleed air valves 228a-d. Alternatively, air may be bled from the low-pressure compressor 202.

Both the high and low-pressure compressors 202, 204 operate at different absolute pressures during operation, with the high-pressure compressor 204 operating at a higher pressure than the low-pressure compressor 202. Additionally, each compressor 202, 204 comprises a plurality of compressor stages, each of which operates at a different absolute pressure than each of the other stages, with pressure rising through each stage. For example, the low-pressure compressor 202 may comprise between two and five stages, while the high-pressure compressor 204 may comprise between five and ten stages. In some examples, each compressor may comprise a multi-stage axial-flow compressor, though other types of multi-stage compressors may be suitable, such as centrifugal or axi-centrifugal types as are well known to the skilled person. In the present embodiment, the low-pressure compressor 202 comprises three stages, while the high-pressure compressor 204 comprises ten stages. It will be understood that, as the compressor pressure rises, so does the temperature of the compressed gas.

In the present embodiment, four compressor bleeds 226a-d are provided. The first compressor bleed 226a is provided at a stage which represents 10% of the overall temperature rise provided by the high-pressure compressor 204. The second compressor bleed 226b is provided at a stage which represents 40% of the overall temperature rise of the high-pressure compressor 204. The third compressor bleed 226c is provided at a stage which represents 60% of the overall temperature rise of the high-pressure compressor 204. The fourth compressor bleed 226d is provided at a stage which represents 75% of the overall temperature rise of the high-pressure compressor 204. As will be understood, the temperature rise provided by the compressor will vary depending on shaft rotational speed. However, the relative work done by each stage is relatively constant throughout operation, and as such, the relative temperature rise as a proportion of overall compressor temperature rise is also constant, irrespective of engine rotational speed, environmental conditions etc.

Figure 3:
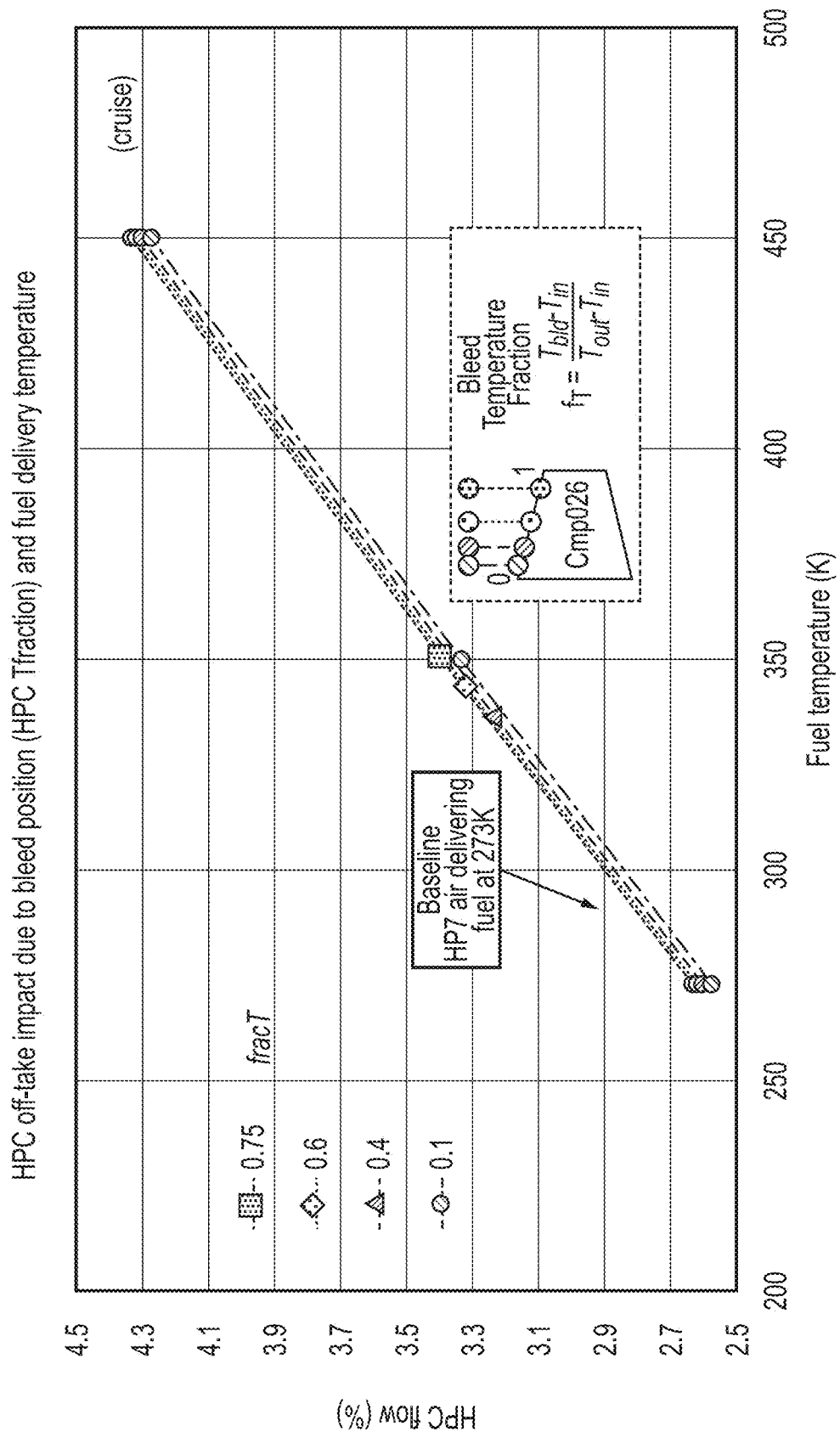
FIG. 3 is a graph showing a relationship between bleed flow to a burner as a percentage of high-pressure compressor mass flow, and absolute fuel temperature at cruise conditions.

Referring to FIG. 3, the inventors have found that there is a relatively fixed relationship between a percentage of overall core air mass flow W % which is extracted to supply the burner 218 with high pressure air, and the resultant fuel temperature at cruise conditions. The term "overall core air mass flow" will be understood as referring to the mass of air entering the core inlet at the inlet to the low-pressure compressor 202. I.e. it is the mass of air that enters the engine that enters the engine core, and not the bypass. As will be understood, some percentage of core air mass flow is bled from the compressor at various stages, both for supplying the preheater 218, and for handling and other customer air bleeds. Consequently, core air mass flow at the outlet of the compressor adjacent the combustor is generally somewhat lower than core inlet mass flow.

As used herein, "maximum take-off conditions" refers to a maximum engine thrust for which the engine is certified. Typically, this thrust is achieved at relatively low forward speed at a "take-off/go-around" engine thrust lever setting, and may comprise a flat-rated maximum take-off thrust, rated for ISA+20 atmospheric conditions at sea level. as will be understood, this maximum take-off thrust will vary between engines of different types having, for example, different sizes, but a given certified engine type will have a single maximum take-off thrust rating for that type.

Similarly, as used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

At both cruise and maximum take-off conditions, fuel must be provided by the pump 216 to the main gas turbine engine combustor 206 at a minimum pressure sufficient to overcome the pressure within the combustor (P30), while providing sufficient additional pressure to drive hydrogen into the combustor 206 at the required rate, such that mixing occurs. Typically, modern gas turbine engines have combustor inlet pressures of between 5 and 20 Bar at cruise conditions. A fuel pressure approximately twice the combustor inlet pressure P30 has been found to be desirable to provide the necessary fuel inlet conditions. As such, the hydrogen pumping system is configured to provide hydrogen to the combustor 206 at an inlet pressure between 10 and 40 Bar at cruise conditions. In one system modelled by the inventors, hydrogen was provided at an inlet pressure of approximately 25 Bar at cruise conditions.

In the engines modelled by the inventors, a minimum fuel temperature of 273 Kelvin (K) downstream of the heat exchanger 223 is assumed, as temperatures lower than this will risk icing in the fuel system. In some cases however, a temperature as low as 150K may be acceptable, as this will still enable combustion of the hydrogen, though icing remains a risk. Where further heating equipment downstream of the heat exchanger 223 is provided, still lower temperatures may be acceptable at the heat exchanger 223 outlet.

At the minimum temperature of 273K, in systems modelled by the inventors, the burner 218 requires between 2.5 and 2.7% of overall high-pressure compressor mass flow W in order to sustain combustion, and produce the require hydrogen fuel temperature at cruise conditions. Lower temperatures may be permitted if icing can be avoided with other means, such as increased insulation.

Similarly, at the minimum temperature of 273K, in systems modelled by the inventors, the burner 218 requires between 3.1 and 3.4% of overall high-pressure compressor mass flow W % in order to sustain combustion, and produce the require hydrogen fuel temperature at maximum take-off conditions Similarly, at the maximum temperature of 450K, the burner 218 requires between 4.2 and 4.4% of overall high-pressure compressor mass flow W in order to sustain combustion and produce the require hydrogen fuel temperature at cruise conditions, and will require between 5.5 and 5.8% of overall high-pressure compressor mass flow W in order to sustain combustion and produce the require hydrogen fuel temperature at maximum take-off conditions. As will be appreciated, this higher core mass air flow percentage may represent a loss to overall engine efficiency, as additional compressor work will be required to deliver a required flow to the combustor. Consequently, lower hydrogen delivery temperatures are generally preferred.

In order to deliver this hydrogen fuel temperature, the burner 218 is configured to provide an outlet temperature of between 900K and 1200K, and in one example studied by the inventors, the burner was configured to generate an outlet temperature of approximately 1000K. Such temperatures can be adequately tolerated by the heat exchanger 223, while providing sufficient temperature difference to heat the fuel to the required temperature in a compact and efficient heat exchanger 223. Additionally, the firing temperature affects burner emissions, particularly oxides of nitrogen (NOx). At temperatures of approximately 1000K, NOx is minimised.

As can be seen from FIG. 3, there is a substantially linear relationship between high-pressure compressor bleed flow and resulting fuel temperature when the engine is run at cruise conditions, such that intermediate values can be read from FIG. 3. In general therefore, a ratio $R_1$ of core air mass flow W % to heated fuel temperature T can be identified as between 0.008 and 0.015 at cruise conditions as defined above. In particular examples studied by the inventors, a ratio $R_1$ of between 0.09 and 0.1 has been found to be even more optimal.

Figure 6:
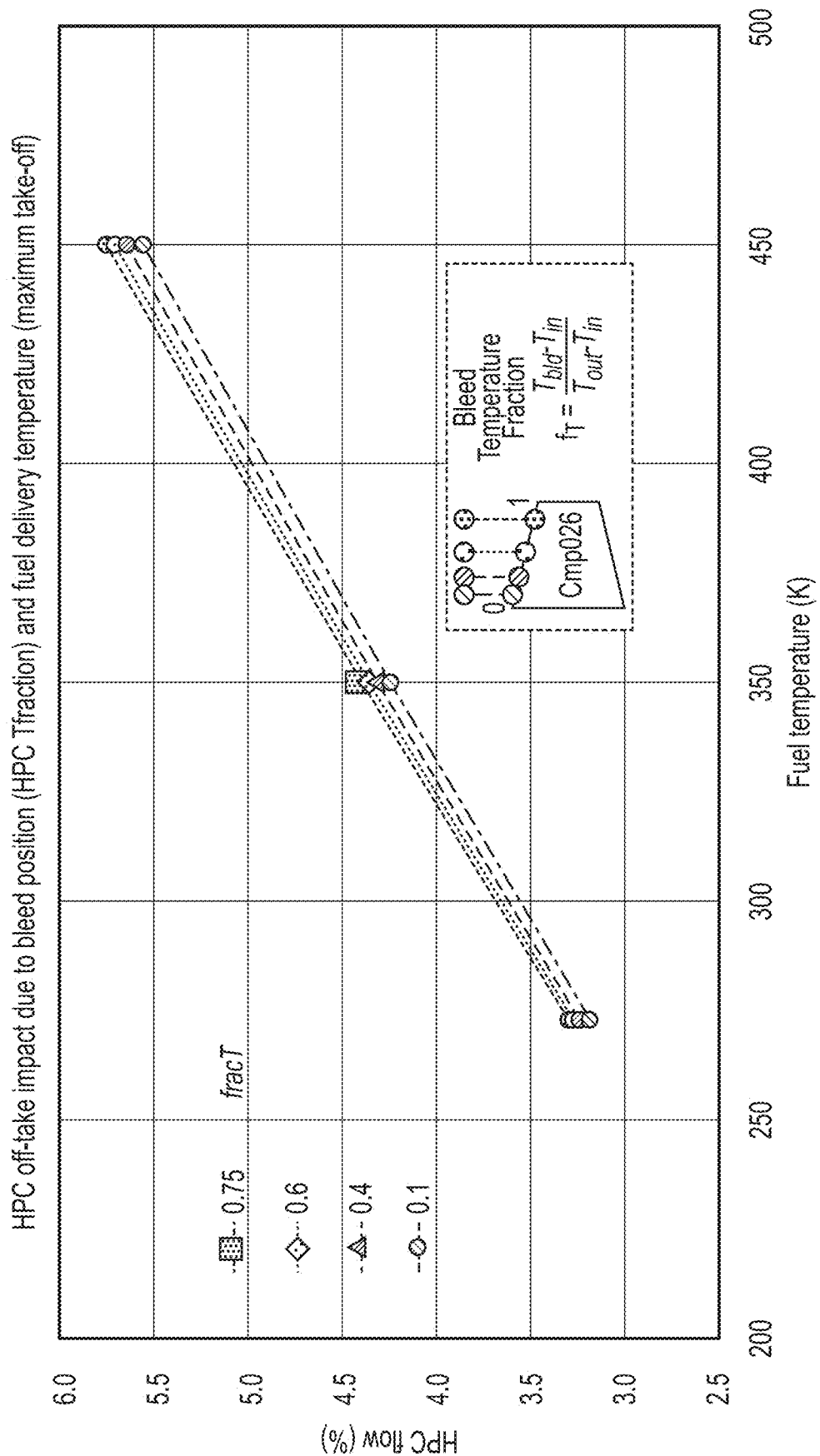
FIG. 6 is a graph showing a relationship between bleed flow to a burner as a percentage of high-pressure compressor mass flow, and absolute fuel temperature at maximum take-off conditions.

A similar trend can be seen from FIG. 6, which relates high-pressure compressor bleed flow and resulting fuel temperature when the engine is run at maximum take-off conditions. At these conditions, both fuel flow and fuel pressure are typically higher than at cruise, due to the higher thrust and the lower pressure altitude at which the engine is operated.

Again, a relatively linear relationship between compressor bleed flow and fuel temperature is found, though the required compressor air flow is higher. At maximum take-off conditions, the ratio $R_1$ of core air mass flow W % to heated fuel temperature T is again between 0.008 and 0.015. in some cases, the ratio $R_1$ may be between 0.01 and 0.013 and may be between 0.011 and 0.012 and may be approximately 0.01 $K^{-1}$. As can be seen therefore, the ratio $R_1$ may not vary greatly during operation between maximum take-off and cruise conditions.

Figure 4:
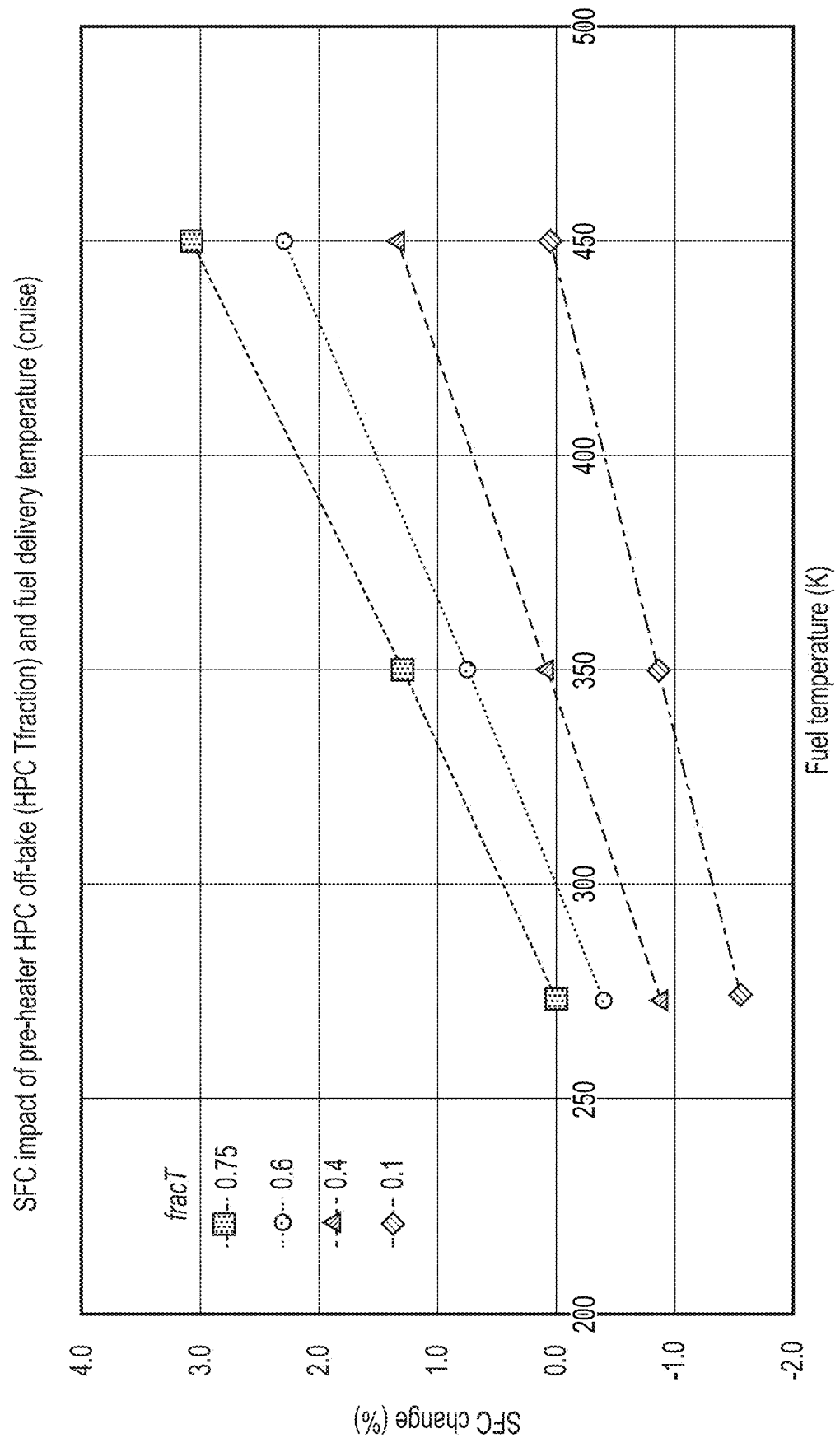
FIG. 4 is a graph showing a relationship between fuel temperature and thrust specific fuel consumption for various compressor bleed offtakes at cruise conditions.

Referring to FIG. 4, the impact of the bleed flow on the overall core size of the gas turbine engine 203 at different bleed points is shown relative to a baseline, in which air is drawn from the fourth compressor bleed 226d.

Figure 5:
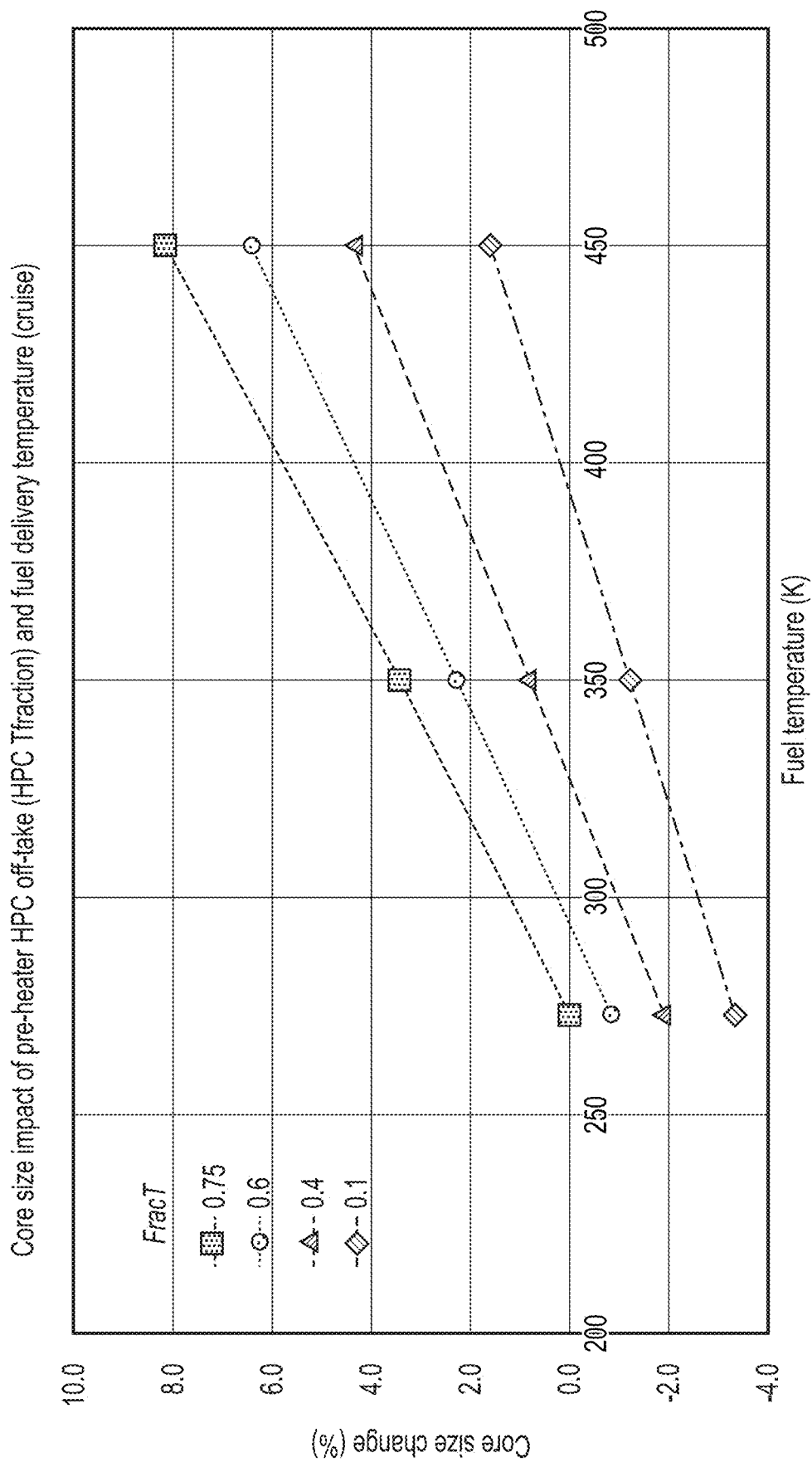
FIG. 5 is a graph showing a relationship between fuel temperature and core size for various compressor bleed offtakes at cruise conditions.

As can be seen from FIG. 5, in general, as the required fuel delivery temperature increases, the core size also increases due to the higher bleed flows required to supply sufficient high-pressure air to the burner 218. Raising the fuel delivery temperature increases core size by approximately 1.5% for every 100° C. increase in fuel delivery temperature. As will be understood, increased core size correlates with increased core mass.

However, for a given fuel delivery temperature, the stage from which the high-pressure air is drawn also affects core size, both for cruise and maximum take-off conditions. For example, providing bleed flow from a stage having a fractional temperature rise of 75% of overall high-pressure compressor temperature rise (which corresponds to the fourth bleed 226d) results in a core size that is approximately 3.5% larger than where the bleed flow is drawn from a stage having a fractional temperature rise of 10% of overall high-pressure compressor temperature rise (which corresponds to the first bleed 226a). This can be seen by a comparison between the uppermost line (indicated by a square in FIG. 3) compared to the lowermost line (indicated by a circle in FIG. 3). Similarly, drawing compressed air from intermediate stages results in intermediate core sizes. As such, it is desirable to draw air from the lowest compressor stage possible to minimise core size despite the resultant higher preheater fuel flow required (in view of the higher heat input required due to the lower compressor bleed air temperature). In studies conducted by the inventors, the inventors have found that core gas turbine engine core size is a more important consideration than preheater fuel flow. On the other hand, if bleed air having a pressure which is too low is utilised, the size of the burner becomes excessive. As such, it is typically necessary to utilise compressor bleed from the high-pressure compressor 204.

Figure 7:
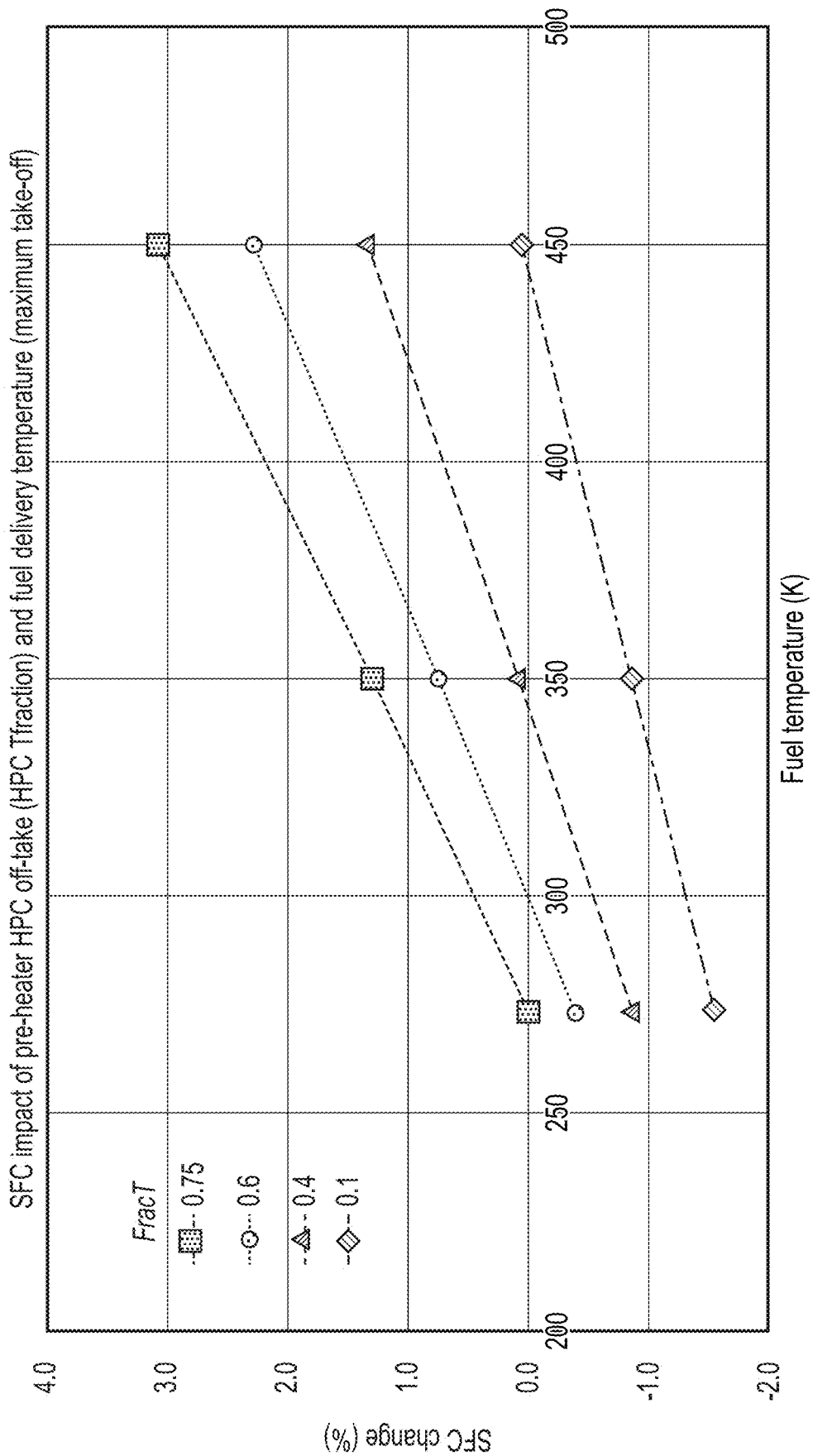
FIG. 7 is a graph showing a relationship between fuel temperature and thrust specific fuel consumption for various compressor bleed offtakes at maximum take-off conditions.

Similarly, FIGS. 4 and 7 show the impact of the bleed flow on the overall Thrust Specific Fuel Consumption (SFC)

of the gas turbine engine 203 at different bleed points is shown relative to a baseline, in which air is drawn from the fourth compressor bleed 226d at cruise and maximum take-off conditions respectively. A lower SFC is generally desirable, as this will reduce overall fuel consumption, and increase range.

Again, in general, as the required fuel delivery temperature increases, the SFC also increases due to the higher bleed flows required to supply sufficient high-pressure air to the burner 218, and also (to a lesser extent) to the increased burner fuel flow required. Raising the fuel delivery temperature increases SFC by approximately 1.5% for every 100° C. increase in fuel delivery temperature. This trend is valid for both cruise (where the majority of fuel is burned) and maximum take-off thrust (which may define the maximum fuel flow requirements of the pump)

However, for a given fuel delivery temperature, the stage from which the high-pressure air is drawn also affects SFC. For example, providing bleed flow from a stage having a fractional temperature rise of 75% of overall high-pressure compressor temperature rise (which corresponds to the fourth bleed 226d) results in an SFC that is approximately 1.5% higher than where the bleed flow is drawn from a stage having a fractional temperature rise of 10% of overall high-pressure compressor temperature rise (which corresponds to the first bleed 226a). Similarly, drawing compressed air from intermediate stages results in intermediate SFC deltas. As such, it is desirable to draw air from the lowest compressor stage possible to minimise SFC.

Accordingly, the valves 228a-d are controlled by a controller 230 in accordance with a control schedule.

Two control parameters are controlled by the controller 230—compressor bleed air mass flow, and compressor bleed air location.

Firstly, the controller controls the valves 228a-d such that an overall mass flow of between 2.5% and 4.5% of core bleed air mass flow W % is extracted and provided to the burner 218 during cruise conditions, and between 3% and 6% at maximum take-off conditions. The controller also controls a fuel offtake valve (not shown) to supply fuel to the burner 218 to maintain burner outlet temperature of between 900 and 1100, and preferably approximately 1000K, such that the ratio $R_1$ is maintained between 0.008 and 0.015, and preferably approximately 0.01 $K^{-1}$. Control may be on the basis of open loop control based on an engine model, and may for example follow a schedule based on engine control lever position and/or one or more other engine parameters such as main engine shaft speed, calculated or measured engine compressor outlet pressure P30, or other parameters. Alternatively, the controller may operate in accordance with a closed loop control scheme based on a measured or calculated fuel temperature and/or pressure, with burner fuel flow and compressor bleed offtake mass flow as controlled parameters.

Secondly, the controller 230 operates the valves 226a-d to provide bleed air from the compressor bleed having the lowest pressure, which still meets the mass-flow and pressure requirements of the burner 218.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

The invention claimed is:

1. A method of delivering hydrogen fuel to a gas turbine engine of an aircraft propulsion system, the gas turbine engine comprising a core engine comprising a compressor, a combustor and a turbine in sequential air flow series, the gas turbine engine further comprising a fuel offtake configured and arranged to divert a portion of hydrogen fuel from a fuel conduit, at least one compressor bleed offtake, at least one bleed offtake valve configured to control flow through the at least one compressor bleed offtake, a burner configured to burn the portion of hydrogen fuel diverted from the fuel conduit with air bled from the compressor via the at least one compressor bleed offtake to produce exhaust gases, a heat exchanger configured to transfer heat from the exhaust gases produced by the burner to hydrogen fuel in the fuel conduit to provide heated hydrogen fuel at a temperature T, and a controller configured to control the at least one bleed offtake valve, based on a schedule, to extract a percentage core air mass flow W % such that a ratio $R_1$ of core air mass flow W % to heated fuel temperature T in Kelvin is between 0.008 and 0.015 $K^{-1}$ at cruise conditions, the method comprising:
    pumping hydrogen fuel from a storage tank through the fuel conduit;
    diverting the portion of hydrogen fuel from the fuel conduit;
    extracting the percentage core air mass flow W % from the compressor of the gas turbine engine;
    burning the portion of hydrogen fuel diverted from the fuel conduit in the burner with the air bled from the compressor to produce exhaust gases, and exchanging heat between the exhaust gases and the hydrogen fuel in the heat exchanger to produce heated hydrogen fuel at the temperature T; and
    operating the burner such that the ratio $R_1$ of core air mass flow W % to heated fuel temperature T is between 0.008 and 0.015 $K^{-1}$.

2. An aircraft propulsion system comprising a gas turbine engine configured to burn hydrogen fuel supplied from a hydrogen supply tank via a fuel conduit, the gas turbine engine comprising:
    a core engine comprising a compressor, a combustor and a turbine in sequential air flow series;
    a fuel offtake configured and arranged to divert a portion of hydrogen fuel from the fuel conduit;
    at least one compressor bleed offtake;
    at least one bleed offtake valve configured to control flow through the at least one compressor bleed offtake;
    a burner configured to burn the portion of hydrogen fuel diverted from the fuel conduit with air bled from the compressor via the at least one compressor bleed offtake to produce exhaust gases;
    a heat exchanger configured to transfer heat from the exhaust gases produced by the burner to hydrogen fuel in the fuel conduit, to provide heated hydrogen fuel at a temperature T; and
    a controller configured to control the at least one bleed offtake valve, based on a schedule, to extract a percentage core air mass flow W % such that a ratio $R_1$ of core air mass flow W % to heated fuel temperature T in Kelvin is between 0.008 and 0.015 $K^{-1}$ at cruise conditions.

3. The aircraft propulsion system according to claim 2, wherein the controller is configured to control the at least one bleed offtake valve such that the ratio $R_1$ of core air mass flow W % to heated fuel temperature T is between 0.01 $K^{-1}$ and 0.013 $K^{-1}$ at maximum take-off conditions.

4. The aircraft propulsion system according to claim 2, wherein the burner is configured to provide an exhaust gas outlet temperature of between 900K and 1100K.

5. The aircraft propulsion system according to claim 2, wherein the controller is configured to control the at least one bleed offtake valve to extract a percentage core air mass flow W % between 3% and 6% at maximum take-off conditions.

6. The aircraft propulsion system according to claim 1, wherein the burner and heat exchanger are configured to provide a heated hydrogen fuel temperature T of between 150 and 450K.

7. The aircraft propulsion system according to claim 2, wherein the gas turbine engine comprises a lows-pressure compressor and a high-pressure compressor coupled to a lows-pressure turbine and a high-pressure turbine respectively by respective independently rotatable shafts, and the at least one compressor bleed offtake is associated with the high-pressure compressor.

8. The aircraft propulsion system according to claim 2, wherein the hydrogen supply tank is configured to store liquid hydrogen.

9. The aircraft propulsion system according to claim 2, wherein the hydrogen supply tank is configured to store liquid hydrogen at a pressure of between 1 and 4 Bar.

10. The aircraft propulsion system according to claim 2, wherein the aircraft propulsion system comprises a hydrogen pumping system configured to provide pressurised hydrogen to the burner and to the gas turbine engine core combustor.

11. The aircraft propulsion system according to claim 10, wherein the hydrogen pumping system is configured to provide hydrogen having a pressure of between 10 and 100 Bar.

12. The aircraft propulsion system according to claim 2, wherein the gas turbine engine comprises at least first and second compressor bleed offtakes of the at least one compressor bleed offtake, the first and second compressor bleed offtakes of the at least one compressor bleed offtake provided at different stages of the compressor.

13. The aircraft propulsion system according to claim 2, wherein the at least one compressor bleed offtake includes a plurality of compressor bleed offtakes and the at least one bleed offtake valve includes a plurality of bleed offtake valves that are each associated with a respective compressor bleed offtake of the plurality of compressor bleed offtakes.

14. The aircraft propulsion system according to claim 13, wherein the plurality of compressor bleed offtakes and the plurality of offtake valves are arranged at different stages of the compressor.

15. The aircraft propulsion system according to claim 14, wherein the controller is configured to select a bleed offtake valve of the plurality of bleed offtake valves at a lowest compressor stage which meets at least one of a minimum combustion pressure and a minimum heated fuel temperature T.

16. The aircraft propulsion system according to claim 14, wherein the controller is configured to select a bleed offtake valve of the plurality of bleed offtake valves for provision of compressed air to the burner which meets a minimum combustion pressure and a minimum heated fuel temperature T while resulting in a lowest overall system fuel flow.

17. The aircraft propulsion system according to claim 2, wherein the controller is configured to control a fuel offtake valve that regulates a flow of the portion of hydrogen fuel diverted from the fuel conduit so as to control fuel supply to the burner to maintain burner outlet temperature.

* * * * *